United States Patent [19]

Masuhara et al.

[11] 3,717,502

[45] Feb. 20, 1973

[54] METHOD FOR PROVIDING ANTICOAGULANT SURFACES ONTO ARTICLES

[75] Inventors: Eiichi Masuhara, Tokyo; Imai Yohji, Chiba, both of Japan

[73] Assignee: President of Tokyo Medical and Dental University, Tokyo, Japan

[22] Filed: June 15, 1970

[21] Appl. No.: 46,470

[30] Foreign Application Priority Data

June 13, 1969 Japan............................44/46132

[52] U.S. Cl.........117/124 D, 117/124 E, 117/132 C, 117/138.8 A, 117/138.8 B, 117/138.8 D, 117/138.8 E, 117/138.8 UA, 424/183, 3/1
[51] Int. Cl. .............................................A61k 17/18
[58] Field of Search.........117/124 E, 124 D, 132 C, 138.8 B, 117/138.8 D, 138.8 E, 138.8 UA; 424/183; 3/1

[56] References Cited

UNITED STATES PATENTS

| | | | |
|---|---|---|---|
| 3,634,123 | 1/1972 | Eriksson et al. | 117/72 |
| 3,453,194 | 7/1969 | Bennett et al. | 204/159.12 |
| 2,970,066 | 1/1961 | Brasure | 117/33.3 |

FOREIGN PATENTS OR APPLICATIONS 1,459,646   10/1966   France

*Primary Examiner*—William D. Martin
*Assistant Examiner*—David Cohen
*Attorney*—Wenderoth, Lind & Ponack

[57] ABSTRACT

This invention relates to a method for providing anticoagulant surfaces onto articles by treating said articles with an organic solvent solution of a coprecipitated material produced by mixing an aqueous solution of heparin and an aqueous solution of a certain cation surface active agent. Said solution may include an organic solvent-soluble plastic material.

6 Claims, No Drawings

METHOD FOR PROVIDING ANTICOAGULANT SURFACES ONTO ARTICLES

DETAILED EXPLANATION OF INVENTION

This invention relates to a method for providing anticoagulant surfaces onto articles by coating the surfaces of said articles with a medium comprising an organic solvent-soluble co-precipitated material produced by mixing an aqueous solution of heparin and an aqueous solution of a certain cation surface active agent. When the anticoagulant surfaces of said articles are contacted with the whole blood of the human body and animals, the whole blood is protected from clot formation.

Heparin is a substance which is found in the living body and it is considered that heparin has the function and effect for preventing the clot formation as the blood vessels contain it on their surface.

Heretofore, there have been proposed various kinds of methods in the art for providing anticoagulant surfaces on plastic materials by adsorbing heparin onto the surface of plastics.

For example, the plastic materials are coated with graphite and then the coated plastic materials are dipped into an aqueous solution of a cation surface active agent for adsorbing it and then the dipped plastic materials are dipped into an aqueous solution of heparin for adsorbing it. Also, the plastic materials are grafted with monomeric styrene and then the grafted styrene is converted to chloromethylated styrene, and then the chloromethylated styrene is converted to its quaternary ammonium salt and finally the resultant plastic materials are dipped into an aqueous solution of heparin for adsorbing it onto the surface. In another method, the plastic materials such as a silicone resin are coated with a powder of heparin and then the silicone resin is tightly combined with heparin on the plastic materials by irradiation. These methods, however, are complicated in operation and also they can not provide the plastic materials with a prolonged and high ability to prevent the coagulation of blood on their surfaces. Therefore, there has been an earnest desire for the emergence of an improved method in the art by which the defects of the prior methods can be removed.

The plastic materials have been widely used in the medical fields but they are highly troublesome because they cause thrombus formation when they are contacted with blood. If this difficulty can be removed, it is possible to make a rapid progress in the field of the artificial internal organs which are fabricated by using plastic materials.

The object of this invention is to provide non-thrombogenic articles, when said articles are contacted with blood.

In order to achieve the above object of this invention, we have devised a method for providing anticoagulant surfaces onto articles by coating them with an organic solvent-soluble co-precipitated material consisting of heparin and a cation surface active agent or a liquid composition comprising such a co-precipitated material and a plastic material which are dissolved in organic solvents, and then drying the articles thus treated.

The cation surface active agent which is used for the preparation of the organic solvent-soluble co-precepitated material in this invention includes dimethyl alkylbenzyl ammonium chloride (or chlorinated benzalconium), benzyldimethyl-2-[2-(p-1,1,3,3-tetramethylbutyl phenoxy) ethoxy] ethyl ammonium chloride (or chlorinated benzethonium), alkyl-trimethylammonium chloride, dilauryl-dimethylammonium chloride or the like.

The organic solvent which is used in this invention includes dimethyl formamide, dimethyl acetamide, ethyl alcohol, propyl alcohol, butyl alcohol, dioxane, tetrahydrofuran or the like or mixtures of them.

The plastic materials which are used in this invention can be classified into two types, one of which can be dissolved in the same organic solvents as those in which the co-precipitated material consisting of heparin and a cation surface active agent can be dissolved. Such plastic materials include polyvinyl chloride, polymethacrylic esters, polyacrylic esters, polyacrylonitrile, polyvinylbutryral, polyepichlorohydrin, polyurethane and polyamides. When such plastic materials are used, they and the co-precipitated material of heparin and a cation surface active agent can be dissolved in common organic solvents to produce a liquid composition. The liquid composition can easily be applied on the surfaces of the plastic articles to make them anticoagulant.

Another type of the plastic materials are those that can not dissolve in a common organic solvent. Such plastic materials include polypropylene, polyethylene, polysiloxan, polytetrafluoroethylene, natural rubber, polyesters and polycarbonates. When such plastic materials are used, they, at first, must be coated with the first type of plastic materials, which can be dissolved in a common organic solvent in the same manner as by the conventional coating technique or must be grafted with vinyl chloride, methacrylic esters, acrylic esters, or the like. Then, a liquid composition comprising the coated plastic material or the same kind of plastic as used in grafting, the co-precipitated material consisted of heparin and a cation surface active agent and the common organic solvent can be applied on the surfaces of the plastic articles to make them non-thrombegenic.

In the most simple embodiment of this invention, a liquid composition is prepared by dissolving the co-precipitiated material consisted of heparin and a cation surface active agent in an organic solvent or dissolving the co-precipitated material consisted of heparin and a cation surface active agent in combination with diisocyanate such as 4,4'-diphenylmethane diisocyanate or tolylene diisocyanate or the like in an organic solvent and then the liquid composition is applied on the surfaces of plastic articles and dried under heating. When dimethylformamide or ethyl alcohol is used as the organic solvent, the resultant liquid composition can contain the co-precipitated material in a concentration of above 80 percent.

When the liquid composition is prepared by dissolving the co-precipitated material and the plastic material in the common organic solvent, it is preferable to use the liquid composition containing the co-precipitated material in an amount of above 10 percent. It is, however, preferable to treat the plastic article by using the liquid composition containing the co-precipitated material in an amount of above 30 percent when the treated plastic article is contacted with the blood for a prolonged period of time.

Some plastic materials are highly compatible with the co-precipitated material and therefore when such plastic materials are dissolved in dimethylformamide as the organic solvent, the resultant liquid composition is homogenous and contains said plastic materials and the co-precipitated material in any desired proportions. Such a liquid composition can be applied to the plastic articles in accordance with this invention.

When it is desired to produce a liquid composition suitable for coating plastic articles and metal articles, said liquid composition can be produced by disolving a polymer or a copolymer selected from the group consisting of polyvinyl acetate, polyvinyl chloride, polyacrylic esters, polymethacrylic esters and copolymers which are produced by copolymerizing at least one member selected from the group consisting of vinyl chloride, vinyl acetate, acrylic esters, methacrylic esters and the like, and the co-precipitated material in an organic solvent.

The liquid compositions as mentioned above can be used as the coating material for articles but it should be noted that such liquid compositions themselves can be molded into shaped plastic articles having resistant surfaces and bodies against the coagulation of blood.

The following examples prove the fact that the articles coated with the co-precipitated material have their outstanding anticoagulant character for a prolonged period of time. Therefore, this invention can be applied to any articles which are contacted with blood, such as an artificial heart, an artificial valve of the heart, an artificial blood vessel, an artificial lung, an artificial supply pipe and a tool for transfusing blood.

The co-precipitated material consisted of heparin and a cation surface active agent was prepared as follows and used in the following examples.

50ml of a 10 percent aqueous solution of dimethylakylbenzyl ammonium chloride (or chlorinated benzalconium) were charged into a flask and then 5ml of distilled water in which 0.5 gram of sodium heparin was dissolved were added drop by drop into the flask with agitation to produce a co-precipitate. The co-precipitate was separated by centrifuging and then it is washed with water and dried.

This invention is illustrated by the following examples.

EXAMPLE 1

0.1 part of the co-precipitated material and 0.9 part of polyvinyl chloride were dissolved in a mixture of 1 part of dimethylformamide and 8 parts of tetrahydrofuran to produce a liquid composition. The liquid composition was applied onto the inner surface of a tube made of polyvinyl chloride and then the coated composition was dried by evaporating the organic solvents contained in the said composition. The coated tube was dipped in a physiological saline solution for 5 days and then a clotting test was carried out as follows. 0.9ml of the A C D human blood and 0.1ml of a 0.1mol solution of calcium chloride were charged into the coated tube and the clotting was tested in a water bath at 37°C while the coated tube was intermittently inclined. In the same manner, a control test was carried out by using a polyvinyl chloride tube which was not coated with the liquid composition. As the test results, it was found that the blood, which was charged into the coated tube, was not coagulated even after an elapse of 5 hours but that the blood charged in the control uncoated tube was coagulated after an elapse of only 4 minutes.

EXAMPLE 2

0.2 part of the co-precipitated material and 0.8 part of poly-2-hydroxyethyl methacrylate were dissolved in 4 parts of dimethylformamide in a glass test tube and then one part of a dimethylformamide solution containing 4,4'-diphenylmethane diisocyanate in an amount of 10 percent was added into the glass test tube to produce a liquid composition. The inner surface of the glass test tube was coated with the liquid composition by rotating said test tube. Then the coated composition was dried under vacuum by heating the test tube. The coated tube was dipped in a physiological saline solution for 5 days and then the clotting test was performed in the same manner as in example 1. A control test was carried out by using a glass test tube which was not coated with the liquid composition. As the test results, it was found that the blood contained in the coated tube did not coagulate after an elapse of 5 hours but that the blood charged in the control uncoated tube was coagulated within only 4 minutes.

EXAMPLE 3

A polyvinyl chloride tube having a size of 2.5mm in diameter and 300mm in length was coated on its inner surface with the liquid composition used in example 1. The coated tube was dipped in a physiological saline solution for 5 days and then the coated tube was inserted into the femoral artery of a dog to contact with the circulating blood. The dog was sacrificed after a week and it was observed that the blood did not coagulate on the coated surface of the tube. A control test was carried out by using the same tube which was not coated with the liquid composition and it was found that the circulation of the blood was stopped within an hour due to thrombus formation in the uncoated tube.

EXAMPLE 4

0.4 part of the co-precipitated material and 0.6 part of polymethyl methacrylate were dissolved in 5 parts of dimethylformamide to produce a liquid composition and the liquid composition was coated on a ring, which was made of polymethyl methacrylate, having a size of 8mm in outer diameter, 6mm in inner diameter and 10mm in length and then the coated composition was dried. The coated ring was dipped in a physiological saline solution for two weeks. Then, the coated ring was inserted in the pulmonary artery of a dog and the dog was sacrificed after 16 days. When the coated ring was removed from the artery, it was observed that the coated ring had not developed a thrombus. A control test was conducted by using the same ring which was not coated with the liquid composition and it was observed that the ring was clogged by a thrombus.

EXAMPLE 5

0.35 part of the co-precipitated material and 0.65 part of polyvinyl chloride were dissolved in a mixture of 1 part of dimethylformamide and 7 part of tetrahydrofuran to produce a liquid composition. The liquid composition was coated on the same ring as in example 4 and then the coated composition was dried. The coated ring was dipped in a physiological saline solution for three months. Then, the coated ring was inserted in the pulmonary artery of a dog for 2 weeks. When the coated ring was removed from the artery, it was observed that the coated ring had thrombus.

EXAMPLE 6

A solution of 0.3 part of the co-precipitated material in 5 parts of dimethylformamide was mixed with a solution of 0.7 part of polyepichlorohydrin in 95 parts of tetrahydrofuran to produce a liquid composition. The composition was coated on the inner side of a polyvinyl chloride tube, having a size of 3mm in diameter and 35mm in length and the coated surface was dried. The coated tube was dipped in a physiological saline solution for a week. This tube was inserted in the carotid artery of a dog. The dog was sacrificed after a week. Clotting was not observed on the coated surface.

EXAMPLE 7

A solution of 0.3 part of the co-precipitated material in 0.5 part of dimethylformamide was mixed with a solution of 0.7 part of polyepichlorohydrin in 3 parts of tetrahydrofuran to produce a liquid composition. The liquid composition was coated on the inner side of a polymethyl methacrylate tube, having a size of 6mm in diameter and 10mm in length and the coated composition was dried. The tube was dipped in a physiological saline solution for a week. The coated tube was then inserted in the pulmonary artery of a dog. The dog was sacrificed after 105 days and it was observed that there was no the thrombus formation on the coated surface.

EXAMPLE 8

A solution of 0.3 part of the co-precipitated material in 0.5 part of dimethylformamide was mixed with a solution of 0.7 part of polymethyl methacrylate in 2 parts of tetrahydrofuran to produce a liquid composition. The composition was coated on the inner side of a polymethyl methacrylate tube, having a size of 6mm in diameter and 10mm in length and the coated composition was dried. The tube was then dipped in a physiological saline solution for a week. The coated tube was then inserted in the inferior vena cava of a dog. The dog was sacrificed after 104 days. There was observed no thrombus formation on the coated surface.

EXAMPLE 9

A solution of 0.3 part of the co-precipitated material in 2 parts of dimethylformamide was mixed with a solution of 0.7 part of polyurethane in 5 parts of tetrahydrofuran to produce a liquid composition. The liquid composition was coated on the inner side of a polymethyl methacrylate tube, having a size of 6mm in diameter and 10mm in length and the coated composition was dried. The tube was dipped in a physiological saline solution for a week. The coated tube was then inserted in the inferior vena cava of a dog. The dog was sacrificed after a week. It was found that clotting did not occur on the coated surface.

EXAMPLE 10

A solution of 0.3 part of the co-precipitated material in 0.2 part of dimethylformamide was mixed with a solution of 0.7 part of polyurethane in 4 parts of tetrahydrofuran to produce a liquid composition. The liquid composition was coated on the inner side of a polyurethane tube, having a size of 5mm in diameter and 40mm in length and the coated composition was dried. The tube was dipped in a physiological saline solution for a week. The coated tube was then inserted the femoral artery of a dog. The dog was sacrificed after a week and it was observed that there was no clotting on the coated surface.

EXAMPLE 11

A solution of 0.3 part of the co-precipitated material in 2 parts of dimethylformamide was mixed with a solution of 0.7 part of polyepichlorohydrin in 5 parts of tetrahydrofuran to produce a liquid composition. The liquid composition was coated on the inner side of a modified polyethylene tube, grafted with methyl methacrylate onto polyethylene, having a size of 6mm in diameter and 10mm in length and the coated composition was dried. The tube was dipped in a physiological saline solution for a week. The coated tube was then inserted in the pulmonary artery of a dog. The dog was sacrificed after 10 days and it was observed that there was no thrombus formation on the coated surface.

What we claim is that:

1. A method for providing anticoagulant surfaces onto articles made of plastic materials or glass or metals, characterized by coating said articles with an organic solvent solution containing an organic solvent-soluble plastic material and a co-precipitated material produced by mixing heparin with a cationic surface active agent in an aqueous medium.

2. A method according to claim 1 wherein the cationic surface active agent is selected from the group consisting of dimethyl alkyl benzyl ammonium chloride, benzyldimethyl-2-[2-(p-1,1,3,3-tetramethyl-butyl phenoxy) ethoxy] ethyl ammonium chloride, alkyl-trimethyl ammonium chloride and dilauryl-dimethyl ammonium chloride.

3. A method according to claim 1 wherein the organic solvent-soluble plastic material is selected from the group consisting of polyvinyl chloride, polymethacrylic esters, polyacrylic esters, polyacrylonitrile, polyvinylbutyral, polyepichlorohydrin, polyurethane and polyamides, and the cationic surface active agent is selected from the group consisting of dimethyl alkyl benzyl ammonium chloride, benzyldimethyl-2-[2-(p-1,1,3,3-tetramethylbutyl phenoxy) ethoxy] ethyl ammonium chloride, alkyl-trimethyl ammonium chloride and dilauryl-dimethyl ammonium chloride.

4. A method for providing anticoagulant surfaces onto articles made of plastic materials or glass or metals, characterized by coating said articles with an organic solvent solution containing an organic solvent-soluble plastic material, a member selected from 4,4'-diphenylmethane diisocyanate and tolylene diisocyanate and a co-precipitated material produced by mixing heparin with a cationic surface active agent in an aqueous medium.

5. A method according to claim 4 wherein the organic solvent-soluble plastic material is selected from the group consisting of polyvinyl chloride, polymethacrylic esters, polyacrylic esters, polyacrylonitrile, polyvinylbutyral, polyepichlorohydrin, polyurethane and polyamides, and the cationic surface active agent is selected from the group consisting of dimethyl alkyl benzyl ammonium chloride, benzyldimethyl-2-[2-(p-1,1,3,3-tetramethylbutyl phenoxy) ethoxy] ethyl ammonium chloride, alkyl-trimethyl ammonium chloride and dilauryl-dimethyl ammonium chloride.

6. A method according to claim 4, wherein the cationic surface active agent is selected from the group consisting of dimethyl alkyl benzyl ammonium chloride, benzyldimethyl-2-[2-(p-1,-1,3,3-tetramethylbutyl phenoxy) ethoxy] ethyl ammonium chloride, alkyl-trimethyl ammonium chloride and dilauryl-dimethyl ammonium chloride.

* * * * *